(12) United States Patent
Takizawa et al.

(10) Patent No.: US 10,051,881 B2
(45) Date of Patent: Aug. 21, 2018

(54) METHOD FOR PRODUCING INSTANT NOODLES DRIED BY HOT AIR STREAM AT HIGH TEMPERATURE

(75) Inventors: Hideki Takizawa, Osaka (JP); Takayuki Yagi, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 0 days.

(21) Appl. No.: 13/126,336

(22) PCT Filed: Nov. 11, 2009

(86) PCT No.: PCT/JP2009/069214
§ 371 (c)(1),
(2), (4) Date: Jun. 2, 2011

(87) PCT Pub. No.: WO2010/055860
PCT Pub. Date: May 20, 2010

(65) Prior Publication Data
US 2011/0229613 A1  Sep. 22, 2011

(30) Foreign Application Priority Data

Nov. 12, 2008  (JP) .................................. 2008-290227

(51) Int. Cl.
*A21D 13/00* (2017.01)
*A23L 7/113* (2016.01)

(52) U.S. Cl.
CPC ..................................... *A23L 7/113* (2016.08)

(58) Field of Classification Search
CPC . A23P 1/086; A21C 11/24; B65D 2581/3404; A23L 1/1606; A23L 1/16; A23L 1/162; C08L 101/00; C08L 33/00
See application file for complete search history.

(56) References Cited

U.S. PATENT DOCUMENTS 4,098,906 A * 7/1978 Hisaki et al. ................... 426/94
4,230,735 A   10/1980 Yoshida et al.
(Continued)

FOREIGN PATENT DOCUMENTS

CN       1957744       5/2007
CN     101087537      12/2007
(Continued)

OTHER PUBLICATIONS

Machine Translation of JP 2000-093106 Apr. 4, 2000.*
(Continued)

*Primary Examiner* — Katherine D Leblanc
(74) *Attorney, Agent, or Firm* — Greenblum & Bernstein, P.L.C.

(57) ABSTRACT

A method for producing instant noodles dried by a high-temperature hot air stream, wherein the noodles have a moreish taste and texture similar to fried noodles and yet have a low caloric value. The method for producing instant noodles dried by a high-temperature hot air stream comprises: step (a) producing a noodle band from a noodle dough prepared by adding an edible oil to a noodle dough material containing a raw material flour, and then producing raw noodle strands from the noodle band, step (b) adhering an edible oil to the raw noodle strands, and then steaming the raw noodle strands to produce steamed noodles, step (c) forming a noodle block by packing a predetermined amount of the steamed noodles into a retainer, and step (d) swelling and drying the noodle block by blowing a hot air stream at a temperature of 120° C. to 160° C. onto the noodle block from above and below the retainer at a stream speed of 30 m/s to 70 m/s for a period of 3 to 15 minutes.

9 Claims, 3 Drawing Sheets

(56) References Cited

U.S. PATENT DOCUMENTS

| | | | |
|---|---|---|---|
| 4,590,083 A * | 5/1986 | Hatsugai et al. | 426/557 |
| 5,861,186 A * | 1/1999 | Akira et al. | 426/446 |
| 2006/0134295 A1* | 6/2006 | Maningat et al. | 426/557 |
| 2006/0286286 A1 | 12/2006 | Holzer et al. | |

FOREIGN PATENT DOCUMENTS

| | | | |
|---|---|---|---|
| EP | 1833310 | | 1/2010 |
| JP | 52-128254 | | 10/1977 |
| JP | 53-107438 | | 9/1978 |
| JP | 53-121955 | | 10/1978 |
| JP | 63-248366 | | 10/1988 |
| JP | 3-72854 | | 3/1991 |
| JP | 404210570 | * | 7/1992 |
| JP | 4-252149 | | 9/1992 |
| JP | 9-51773 | | 2/1997 |
| JP | 9-75022 | | 3/1997 |
| JP | 10-313804 | | 12/1998 |
| JP | 2000-93106 | | 4/2000 |
| JP | 2000-093106 | | 4/2000 |
| JP | 2006-122020 | | 5/2006 |
| JP | 2006-288239 | | 10/2006 |
| JP | 2008-503242 | | 2/2008 |
| JP | 2008-524996 | | 7/2008 |
| KR | 800000123 | | 3/1980 |
| WO | 00/18255 | | 4/2000 |
| WO | 2006/002307 | | 1/2006 |
| WO | 2006/066609 | | 6/2006 |

OTHER PUBLICATIONS

Machine translation of JP 2002-253152.*
English language translation of International Preliminary Report on Patentability for PCT/JP2009/069214, dated May 11, 2010.
Indonesian Office Action dated Sep. 28, 2012, and an English translation thereof.
Singapore Official Action dated Jul. 23, 2012.
Database WPIWeek 200761 Thomson Scientific, London, GB; AN 2007-640729 & CN 1 957 744 A (Yan J), May 9, 2007.
Fu et al., "Asian noodles: History, classification, raw materials, and processing", Food Research International, Elsevier Applied Science, Barking, GB, vol. 41, No. 9, Nov. 1, 2008, pp. 888-902.
Wu J et al., "Partial least-squares regression study of the effects of the wheat flour composition, protein and starch quality characteristics on oil content of streamed-and -fried instant noodles", Journal of Cereal Science, Academic Press LTD, XX, vol. 44, No. 2, Sep. 1, 2006, pp. 117-126.
Search report from E.P.O., dated Mar. 21, 2012.
Russia Office action, dated Apr. 12, 2012.
China Office action, dated Mar. 27, 2012 along with an English translation thereof.
China Office action, dated Oct. 11, 2013 along with an english translation thereof.
"The function of enzyme-resistant starch and its application in foods", Food Science, vol. 22, No. 4 , pp. 93-95.
China Office action, dated Jan. 29, 2013 along with an english translation thereof.
Japan Office action, dated Sep. 4, 2012 along with an english translation thereof.
Philippines Office action, dated Jun. 9, 2014.
Mexico Office action, dated Mar. 19, 2014 along with an english translation thereof.
Office Action issued in China Counterpart Patent Appl. No. 200980100512.2, dated Oct. 14, 2015 , along with an English translation thereof.
Singapore Office action, dated Jan. 12, 2015.
India Office action, dated Jan. 29, 2015.
China Office action, dated May 25, 2015 along with an english translation thereof.

* cited by examiner though adhering the edible oil to the raw noodle strands yield a certain level of flavor, this flavor cannot be detected within the interior of the noodle strands. Further, in terms of texture, if the amount of adhered oil on the surface of the noodle strands is increased in order to enhance the fried noodle-like taste, then the noodle strands tend to become sticky following steaming, and the penetration of
METHOD FOR PRODUCING INSTANT NOODLES DRIED BY HOT AIR STREAM AT HIGH TEMPERATURE

TECHNICAL FIELD

The present invention relates to a method for producing instant noodles by drying under a high-temperature hot air stream, and relates specifically to a method for producing instant noodles by drying under a high-temperature hot air stream that yields noodles which have a taste and texture similar to fried noodles and yet have a low caloric value.

BACKGROUND ART

Representative examples of currently known instant noodles include instant deep-fried noodles obtained by using steam or the like to effect a gelatinization of the raw noodle strands, and subsequently deep-frying the gelatinized noodle strands (instant fried noodles), and hot air dried noodles obtained by drying the gelatinized noodle strands in a hot air stream (instant non-fried noodles). Because of the deep-frying production method, instant fried noodles have a very moreish taste and a favorable texture. However, because of the production method, the oil and fat content of the noodle strands is high, meaning they suffer from a high caloric count.

In contrast, the above-mentioned instant non-fried noodles are not produced using a deep-frying method, and therefore the oil and fat content of the noodle strands is low. Accordingly, they have a low caloric value, a light taste reminiscent of raw noodles, and a pleasing texture. However, they lack the moreish taste and texture of the above-mentioned instant fried noodles, which can sometimes result in an unsatiated feeling. Further, blocks of conventional instant non-fried noodles tend to exhibit minimal bulk, with a small void ratio within the block, meaning drying the block of noodles uniformly tends to be problematic. As a result, these instant non-fried noodles tend to be prone to drying irregularities, which makes it difficult to achieve rapid and uniform rehydration when preparing the noodles for eating, and results in inferior texture.

In light of the above circumstances, much investigation has been conducted into methods for producing instant non-fried noodles which have a taste and texture similar to fried noodles but have a low caloric count. JP 03-72854 A (Patent Document 1) discloses a method of adhering an edible oil that has been heated and then cooled in advance to the surface of the noodle strands, either before and/or after steam treatment of the raw noodle strands, and then subjecting the noodle strands to a drying treatment using superheated steam. The Patent Document 1 states that the method described above enables the production of instant non-fried noodles that have a taste and texture similar to fried noodles, and yet have a low caloric value. However, in the method disclosed in the above-mentioned Patent Document 1, a preliminary step of heating the edible oil to a high temperature of 120 to 160° C. and then cooling the oil must be performed in order to achieve a fried noodle-like flavor, and therefore controlling the oil is complicated. Further, in this type of method in which the oil and fat content is lowered simply by adhering an edible oil to the surface of the noodle strands, the fried noodle-like taste and texture tends to be inadequate.

Furthermore, JP 09-51773 A (Patent Document 2) discloses a method for producing instant dried noodles that comprises performing a preliminary drying of steamed noodles in a hot air stream having a stream speed of 20 to 40 m/s and a temperature of 100 to 120° C. in order to reduce the water content of the noodles to 15 to 32%, and subsequently swelling and drying the preliminarily dried steamed noodles in a hot air stream having a stream speed of 10 to 35 m/s and a temperature of 100 to 120° C. The Patent Document 2 discloses that the method described above enables the production of instant noodles that can be rehydrated in a short period of time and exhibit excellent texture. However, the object of the method disclosed in the above-mentioned Patent Document 2 was the production of noodles having a taste and texture similar to fried noodles, and the production of low-calorie instant non-fried noodles was not an object of the invention.

PRIOR ART DOCUMENTS

Patent Documents

Patent Document 1: JP 03-72854 A
Patent Document 2: JP 09-51773 A

DISCLOSURE OF INVENTION

Problems Invention Aims to Solve

The present invention has been developed in light of the above circumstances, and has an object of providing a method for producing instant noodles by drying under a high-temperature hot air stream that yields noodles which have a moreish taste and texture similar to fried noodles and yet have a low caloric value. In particular, an object of the present invention is to provide a method for producing instant noodles by drying under a high-temperature hot air stream, which, despite using hot air drying, is able to achieve a significant reduction in the drying time and a more uniform drying for noodle blocks, and yet yields noodles which have a taste and texture similar to fried noodles, exhibit rapid and uniform rehydration characteristics and have a low caloric value.

Means for Solution of the Problems

In order to achieve the above object, the inventors of the present invention undertook intensive investigation of production techniques for dried instant noodles. Initially, the inventors investigated a method that comprised adhering an edible oil to the surface of raw noodle strands obtained by normal methods, subsequently steaming the noodles to produce steamed noodles, and then packing the noodles in a retainer and blowing a predetermined high-temperature, high-speed hot air stream onto the retainer from above and below the retainer to dry and swell the block noodles. As a result, the inventors found that although the swelling and drying of the noodle block was capable of producing non-fried noodles that had a fried noodle-like texture, the product was not entirely satisfactory. Further, compared with conventional fried noodles, the oily taste and roasted sensation of the dried noodles tended to be inadequate.

It is thought that this lack of a fried noodle-like oily taste is because although adhering the edible oil to the raw noodle strands yield a certain level of flavor, this flavor cannot be detected within the interior of the noodle strands. Further, in terms of texture, if the amount of adhered oil on the surface of the noodle strands is increased in order to enhance the fried noodle-like taste, then the noodle strands tend to become sticky following steaming, and the penetration of the hot air stream through the noodles deteriorates, meaning the swelling of the noodles becomes non-uniform, increasing the chance of drying irregularities and yielding noodles that taste slightly uncooked, with little of the texture associated with fried noodles, and accordingly, a favorable result was not obtained.

Accordingly, the inventors of the present invention continued their investigations, and discovered that, rather than using a method in which an edible oil was merely adhered to the raw noodle strands prior to the drying process using a high-temperature, high-speed hot air stream, by employing a method in which an edible oil was also added to the raw material flour, when the noodle strands were subjected to swelling and drying using the hot air stream, the synergistic effect of promoting swelling from the surface of the noodle strands and promoting swelling from within the noodle strands enables the desired object to be achieved. Furthermore, upon conducting investigations into methods of further reducing the caloric value of the dried instant noodles, the inventors discovered that resistant starch not only has the effect of reducing the caloric value, but also yields the unexpected effect of dramatically improving the drying efficiency. The present invention was developed on the basis of these discoveries, and relates to the aspects described below.

A first aspect of the present invention relates to a method for producing instant noodles dried by a high-temperature hot air stream, wherein the method comprises the following steps:

step (a) producing a noodle band from a noodle dough prepared by adding an edible oil to a noodle dough material including a raw material flour, and then producing raw noodle strands from the noodle band, step (b) adhering an edible oil to the raw noodle strands, and then steaming the raw noodle strands to produce steamed noodles, step (c) forming a noodle block by packing a predetermined amount of the steamed noodles into a retainer, and step (d) swelling and drying the noodle block by blowing a hot air stream at a temperature of 120° C. to 160° C. onto the noodle block from above and below the retainer at a stream speed of 30 m/s to 70 m/s for a period of 3 to 15 minutes.

In the method described above, the amount of edible oil added to the raw material flour is preferably within a range from 0.5 to 2.5% by weight based on the total weight of the raw material flour. Further, the amount of edible oil adhered to the raw noodle strands is preferably within a range from 1 to 8% by weight based on the total weight of the raw material flour. By ensuring that the amount of edible oil added to and adhered to the noodles satisfy these respective ranges, a taste and texture that are similar to fried noodles can be achieved. Furthermore, the moisture content of the noodle block obtained upon swelling and drying is preferably not more than 6%.

Further, another aspect of the present invention relates to the above method for producing instant noodles dried by a high-temperature hot air stream, wherein the above-mentioned retainer has a tapered shape in which the lower opening is larger than the upper opening.

Yet another aspect of the present invention relates to the above method for producing instant noodles dried by a high-temperature hot air stream, wherein a resistant starch is added as one component of the raw material flour.

Further, yet another aspect of the present invention relates to the above method for producing instant noodles dried by a high-temperature hot air stream, wherein three of the above noodle bands are formed, the three noodle bands are laminated to produce a three-layer noodle band having an outer layer/inner layer/outer layer structure, raw noodle strands having a three-layer structure are subsequently produced from the three-layer noodle band, and a resistant starch is added to the inner layer.

This application is based upon and claims the benefit of priority from prior Japanese Application 2008-290227, which was filed on Nov. 12, 2008 by the same applicants as the present application, and the entire contents of this prior application are incorporated herein by reference.

Effects of the Invention

According to the present invention, by adding an edible oil to the raw material flour, also adhering an edible oil to the raw noodle strands prepared from the raw material flour, steaming the noodles, and then rapidly drying and swelling the steamed noodles by blowing a high-temperature hot air stream onto the noodles at high speed, dried instant noodles can be produced that have a moreish taste and texture similar to fried noodles, and yet have a low caloric value. Further, compared with conventional hot air drying methods, the drying time can be shortened considerably, and a more uniform drying can be achieved. Moreover, because the dried instant noodles obtained using the method of the present invention undergo uniform swelling, reconstitution (rehydration) of the noodles occurs uniformly, resulting in a more uniform noodle texture.

BEST MODE FOR CARRYING OUT THE INVENTION

Figure 1:
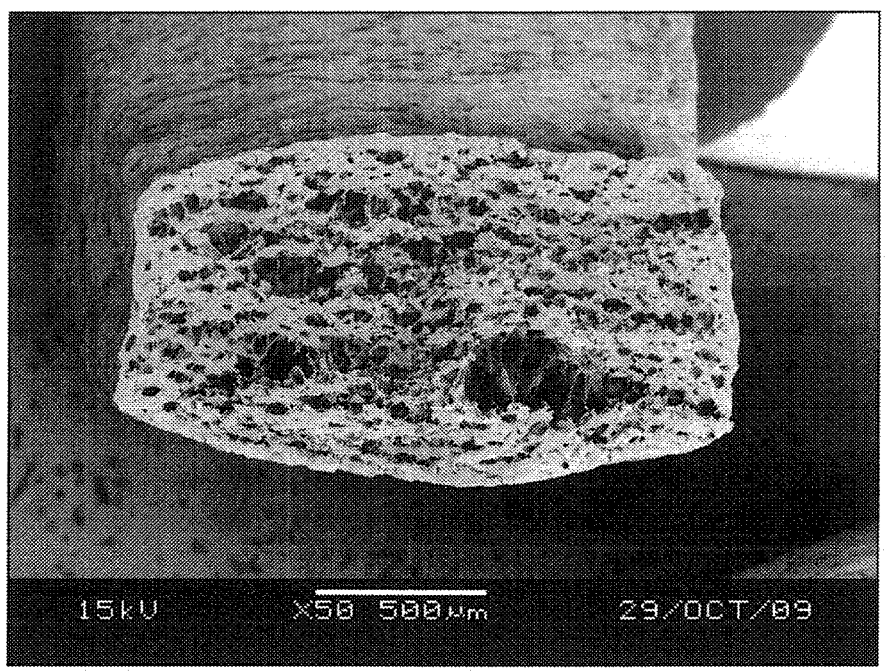
FIG. 1 is an electron microscope photograph (magnification: 50×) illustrating the cross section of a noodle strand of a dried instant noodle of the present invention prepared in example 1.

The present invention is described in further detail below, but the present invention is in no way limited by the following description.

The method for producing instant noodles dried by a high-temperature hot air stream according to the present invention comprises: (a) producing a noodle band from a noodle dough prepared by adding an edible oil to a noodle dough material including a raw material flour, and then producing raw noodle strands from the noodle band, (b) adhering an edible oil to the raw noodle strands, and then steaming the raw noodle strands to produce steamed noodles, (c) forming a noodle block by packing a predetermined amount of the steamed noodles into a retainer, and (d) swelling and drying the noodle block by blowing a hot air stream at a temperature of 120° C. to 160° C. onto the noodle block from above and below the retainer at a stream speed of 30 m/s to 70 m/s for a period of 3 to 15 minutes.

There are no particular limitations on the variety of dried instant noodles produced in the present invention, and any of the noodle varieties commonly known in the art can be produced. Specific examples include udon wheat noodles, soba buckwheat noodles, Chinese noodles and spaghetti.

Further, in the present invention, the expression "high-temperature hot air stream" describes a hot air stream with a high temperature of 120° C. to 160° C. that is blown at a high speed of 30 m/s to 70 m/s. Further, the expression "dried by a high-temperature hot air stream" describes the process of swelling and drying a noodle block by blowing the above high-temperature hot air stream onto the noodle block from above and below the retainer for a period of 3 to 15 minutes.

A more detailed description of each of the steps of the production method of the present invention is presented below. However, the present invention is not limited to the embodiments described below.

Step (a):
1. Raw Material Formulation

In the present invention, the noodle dough material is composed of the types of materials typically used as raw materials for instant noodles. In other words, the noodle dough material comprises a raw material flour as the main component, and also includes a variety of other components such as salt. The raw material flour may use a single cereal flour such as wheat flour, buckwheat flour or rice flour, a single starch such as potato starch, tapioca starch or corn starch, or a mixture of two or more of these materials. The above-mentioned starch may also be a raw starch, an α-starch, or a processed starch such as an etherified starch.

In the present invention, a resistant starch is preferably used as one component of the raw material flour. Using a resistant starch enables a further reduction in the caloric value of the dried instant noodles. In the present invention, the expression "resistant flour" describes a starch that is resistant to the digestive action of digestive enzymes, namely, a starch that is resistant to digestion and absorption within the human intestine. These resistant starches are widely known in the art, as typified by JP 10-313804 A. In the present invention, resistant starches that commonly known in the art can be used, and there are no particular limitations on the type of resistant starch nor on the production method therefor.

Although not a specific limitation of the present invention, in one embodiment of the present invention, the use of a combination of wheat flour and tapioca starch as the raw material flour is preferred. Further in another embodiment of the present invention, the use of a combination of wheat flour, tapioca starch and resistant starch as the raw material flour is preferred.

Examples of components that may be used besides the raw material flour include all manner of additives commonly known in the art, including salt, alkaline agents, alkaline mineral water, various thickeners, noodle improvers, various colorants such as carotene pigments, and preservatives. These additives may be added in the form of powders together with the raw material flour, or may be added in the form of a solution or suspension within the mixing water.

A feature of the present invention is the addition of an edible oil to the noodle dough material. There are no particular limitations on the method used for adding the edible oil. For example, the edible oil may simply be added during mixing of the raw material flour and other additives of the noodle dough material, or the edible oil may be added to and mixed with the mixing water.

The appropriate amount of the edible oil varies depending on factors such as the type and formulation of the raw material flour, and the amounts and properties of the other additives. However, in one embodiment of the present invention, the amount added of the edible oil, per 1 kg of the raw material flour, is within a range from 5 to 27 ml, and preferably from 15 to 22 ml. In other words, the amount of the edible oil relative to the total weight of the raw material flour is within a range from 0.5 to 2.5% by weight, and preferably from 1.5 to 2% by weight. By ensuring that the amount of the edible oil is at least 5 ml, a favorable flavor can be imparted to the noodles. On the other hand, ensuring that the amount is not more than 27 ml prevents the noodles from becoming brittle and results in a more favorable texture. The edible oil used in the present invention refers to any edible oil or fat. Further, the melting point of the oil or fat may be either high or low. Specific examples of the edible oil include vegetable oils and fats such as palm oil, corn oil, sesame oil and canola oil, and animal oils and fats such as lard and beef tallow, and any one or more of these oils and fats may be selected as appropriate.

During the investigations conducted by the inventors of the present invention, it was discovered that adding a resistant starch to the raw material flour not only had the effect of reducing the caloric value, but also yielded the surprising effect of dramatically improving the drying efficiency, which enabled a dramatic shortening of the drying time for a noodle block. From the viewpoints of drying efficiency and texture, the amount added of the resistant starch, per 1 kg of the combined weight of all the raw material flour components other than the resistant starch, is preferably within a range from 50 to 700 g, and more preferably from 300 to 600 g. By ensuring that the amount of the resistance starch is at least 50 g per 1 kg of the raw material flour, the drying efficiency can be improved effectively, and a shortening of the drying time can be achieved with ease. Further, by ensuring that the amount of the resistant starch is not more than 700 g, the caloric count of the dried instant noodles can be reduced while maintaining a favorable texture. Furthermore, favorable noodle strands can be produced without the problems associated with the noodles becoming brittle during the noodle production process.

2. Mixing, Rolling, and Cutting

In the present invention, the above-mentioned noodle dough can be produced by kneading the above noodle dough materials in accordance with normal methods used in the production of instant noodles. More specifically, mixing water and the edible oil are added to the above-mentioned raw material flour, and a mixer is then used to knead the materials together to form a uniform mixture. Following production of a noodle dough in this manner, noodle production is conducted by rolling the noodle dough in a combined machine to produce a noodle band, performing further rolling of the noodle band, and then cutting the noodle band with a cutting blade to produce noodle strands. In an alternative method, raw noodle strands can be produced by extruding the above-mentioned noodle dough through an extruder or the like.

In the present invention, there are no particular limitations on the structure and shape of the produced raw noodle strands, and the noodles may be either single-layer noodles produced from a single noodle band, or multilayer noodles produced by laminating two or more noodle bands to form a noodle band having a multilayer structure, and subsequently forming noodles from this multilayer structure. Particularly in the case of three-layer noodles, the noodles can be produced using a method that is known in the art, wherein noodle bands that form the outer layers are laminated to both sides of the noodle band used for forming the inner layer, thus forming a noodle band having a three-layer structure. In the case of these types of three-layer noodles, if a resistant starch is added to the inner layer, then the drying efficiency of the inner portions of the noodle strands is improved, resulting in a faster drying time for the inner portions of the noodle strands, and therefore the difference between the amount of water lost from the surface of the noodle strands and the amount of water lost from the interior of the noodle strands during drying is small, enabling a more uniform drying with minimal drying irregularities to be achieved. Further, the drying times for the noodle strands and the overall noodle block can be shortened significantly.

Step (b):

3. Oil Adhesion

Next, an edible oil is adhered uniformly to the noodle strands obtained in the step (a) described above. The adhesion can be achieved by spraying or showering the edible oil onto the noodle strands. This spraying or showering can be achieved by using a hand sprayer or spraying tube or the like. The amount of edible oil used during the oil adhesion is preferably within a range from 10 to 90 ml, and more preferably from 10 to 54 ml, per 1 kg of the raw material flour. In other words, relative to the total weight of the raw material flour, the amount of edible oil adhered to the noodles is preferably within a range from 1 to 8% by weight, and more preferably from 1 to 5% by weight.

By ensuring that the amount of the adhered edible oil is at least 10 ml, a favorable fried noodle-like taste can be more easily imparted to the noodles. On the other hand, provided the amount of adhered oil is not more than 90 ml, a favorable taste and texture can be achieved without the noodles becoming oily. If the amount of adhered oil is too large, then the noodles tend to develop an oily feeling, and the taste and texture tend to deteriorate. Furthermore, the excess oil tends to make the surface of the noodle strands sticky, which tends to worsen the penetration of the hot air stream, resulting in non-uniformity in the swelling of the noodles, and an increased likelihood of drying irregularities. The type of edible oil adhered to the noodle strands may be the same as the edible oil added to the noodle dough material, and any edible oil or fat can be used. In consideration of the fluidity of the oil and its suitability to use within machinery, the temperature of the edible oil during the adhesion process is preferably within a range from 40 to 70° C., although the temperature should be determined with due consideration of the type of oil being used, so as to achieve a uniform adhesion of the oil.

4. Steaming

Subsequently, the noodle strands with the edible oil adhered thereto are subjected to a steam treatment for approximately 2 minutes using a typical method used for producing instant noodles, thereby effecting a gelatinization of the noodle strands that produces steamed noodles.

5. Flavoring

In the present invention, if required, the steamed noodles may be subjected to additional processing generally known as a flavoring step, either for the purposes of imparting flavor to the noodle strands and performing cooling, or for the purpose of improving the unraveling properties of the noodle strands during drying and upon consumption. For example, during this additional processing, a solution containing salt, sodium glutamate (MSG), and an unraveling improver (such as lecithin, a glycerol fatty acid ester, or a water-soluble hemicellulose such as soybean fiber) and the like is preferably adhered to the steamed noodles by spraying or showering. In an alternative method, during the additional processing, the steamed noodles are preferably dipped in the solution mentioned above. The amount of the above solution adhered to the steamed noodles as a flavoring liquid or the like is typically 30 ml per 100 g of the steamed noodles. In those cases where a dipping method is employed, the dipping time is preferably within a range from 3 to 10 seconds.

Step (c):

6. Weighing and Packing

Subsequently, the steamed noodles obtained in the step (b) described above are pulled, while being cut to a length of approximately 20 to 25 cm, which represents the amount for a typical single serving (a weight of 80 g/serving), and the cut noodles are then packed inside a retainer (a drying frame) to form a noodle block. The retainer has a taper-shaped outer form such as a circular truncated cone shape or a truncated pyramid shape, and the upper and lower surfaces are open ring shapes. This type of retainer can be mounted on a net conveyor or punching plate. In order to prevent the noodles from flying out of the retainer when the hot air stream is blown onto the noodles from below the retainer during the drying step described below, a lid or punching plate with a plurality of air holes or a network of air holes formed therein may be attached to the upper surface of the retainer following the above-mentioned packing process, although if the noodles are not prone to flying out of the retainer, then using no lid or the like is preferable in terms of improving the drying efficiency of the noodle block. Further, retainers in which the sizes of the upper and lower openings are equal, or in which the lower opening has a larger size than the upper opening are preferred in terms of more readily achieving uniform drying. From the viewpoint of drying efficiency, the degree of openness within the upper and lower surfaces of the retainer represented by the air holes is preferably at least 50%. However, there are no particular limitations on the shape of the air holes, which may be composed of individual holes or a network of interconnected openings.

In one embodiment of the present invention, a ring-shaped retainer is positioned on top of a net conveyor with a reverse taper orientation. Namely, the retainer is positioned so that, when viewed from the side, the tapered shape is wider at the bottom than at the top. A noodle block is formed by packing the thus positioned retainer with a fixed amount of noodle strands having a water content of 40 to 55% that have been subjected to the above flavoring step. The drying step described below is then performed.

The retainers used in the production of instant noodles usually have a shape in which the sizes of the upper and lower openings are equal, or in which the upper opening has a larger size than the lower opening. If a retainer having this type of shape is used, then when the noodle block is removed from the retainer following completion of the drying step, the retainer must be inverted, and in some cases the noodle block may stick to the retainer. In contrast, in the embodiment described above, by using a retainer having a shape in which the lower opening is larger than the upper opening, the retainer need not be inverted to remove the noodle block, and the separation between the retainer and the noodle block following the drying step is excellent.

Step (d):
7. Drying

In the present invention, drying of the noodle block is conducted using a high-temperature, high-speed hot air stream. If the temperature and speed of the hot air stream are insufficient, then the drying efficiency deteriorates, and drying the noodle block to a desirable swelled state tends to become problematic. On the other hand, if the temperature and speed of the hot air stream are excessively high, then other problems such as drying irregularities and burning tend to become more likely. For these reasons, the drying step in the present invention is performed by blowing a hot air stream at a temperature of 120° C. to 160° C. onto the noodle block from above and below the retainer at a stream speed of 30 m/s to 70 m/s. The drying step is preferably performed until the water content within the resulting dried instant noodles is not more than 6%.

Under the drying conditions using the high-temperature and high-speed hot air stream described above, blowing the hot air stream onto the noodle block for a period of approximately 3 to 15 minutes yields the preferred dried instant noodles described above. In one embodiment of the present invention, following completion of the drying step to reduce the water content of the noodle block to not more than 6%, drying is continued for a further 2 to 4 minutes until the water content is further reduced to not more than 2%. In those cases where the drying step is continued in this manner until the water content is reduced to not more than 2%, the noodle block is partially baked, which imparts a baked spicy flavor to the noodle strands, and this is preferred in terms of further enhancing the fried noodle-like taste.

Further, in another embodiment of the present invention, the drying step may be performed in two stages. Specifically, a primary drying is first conducted for 60 to 120 seconds, by blowing a hot air stream at a temperature of 120 to 160° C. onto the top of the retainer at a stream speed of 20 to 40 m/s, and simultaneously blowing a hot air stream at a temperature of 120 to 160° C. from the bottom of the retainer at a stream speed of 50 to 70 m/s, until the water content of the noodle block is reduced to not more than 20%. Subsequently, a secondary drying is performed by blowing hot air streams having a temperature of 120 to 160° C. onto the noodle block from both above and below the retainer at a stream speed of 50 to 70 m/s for a period of 2 to 13 minutes, until the water content of the noodle block is reduced to not more than 6%.

In the above type of embodiment where the drying step is performed in two stages, because the stream speed of the hot air stream blown from above the retainer is suppressed during the initial stages of the drying, causing the noodle strands to be lifted upward, the void ratio within the noodle block can be increased, and the size of the noodle block can be enlarged. Further, as a result of the increase in the void ratio within the noodle block, the drying efficiency improves, meaning the drying time can also be shortened. In the production method of the present invention, after performing the above series of steps and completing the drying step, the noodle block is cooled for a predetermined period, and then removed from the retainer by raising the retainer, thus yielding the desired dried instant noodles.

As described above, according to the method of the present invention, by adding an edible oil to the raw material flour, also adhering an edible oil to the raw noodle strands prepared from the raw material flour, steaming the noodles, and then rapidly drying and swelling the steamed noodles by blowing a high-temperature hot air stream onto the noodles at high speed, dried instant noodles can be produced that have a moreish taste and texture similar to fried noodles, and yet have a low caloric value. Further, compared with conventional hot air drying methods, the drying time can be shortened considerably, and a more uniform drying can be achieved. Moreover, because the dried instant noodles obtained using the method of the present invention undergo uniform swelling, reconstitution (rehydration) of the noodles occurs uniformly, resulting in a more uniform noodle texture.

EXAMPLES

The present invention is described below in further detail based on a series of preliminary experiments and examples. However, the present invention should not be construed as being limited by the examples described below, and all manner of modifications are possible without departing from the scope of the present invention. In the following description, unless stated otherwise, the units "% by weight" are abbreviated as "%". Further, water content values are recorded as the average of a series of values obtained by breaking the noodle strands into small pieces, placing the pieces in a hot air circulating thermostatic dryer at 105° C. for 4 hours, and measuring the reduction in weight caused by the drying.

First, methods of adding an edible oil to the noodles were investigated in detail, by investigating methods that involved spaying the oil onto the noodle strands, methods that involved mixing the oil into the raw material flour, and methods that combined these two techniques.

Preliminary Experiment 1

A method of adding an edible oil to the noodles was investigated by spraying the edible oil onto raw noodle strands that had been cut using a typical method used in the production of instant noodles, and then investigating the effect of the edible oil on the taste and texture of the noodles. Specifically, the investigation was performed in the manner described below.

(1) Production of Dried Noodles 900 g of wheat flour was dry-blended with 100 g of tapioca starch to prepare a raw material flour. To this raw material flour was added 330 ml of a mixing water in which had been dissolved 15 g of salt, 2 g of alkaline mineral water and 0.2 g of a carotene pigment, and the resulting mixture was mixed for 15 minutes in a normal pressure mixer to prepare a noodle dough. This noodle dough was rolled using a rolling machine and then cut using a cutting blade of a square blade No. 20, yielding noodle strands with a thickness of 0.77 mm.

Next, an edible oil was sprayed uniformly onto the surface of the noodle strands with a hand sprayer, in an amount shown in Table 1 below (an amount equivalent to 0 to 11% by weight relative to the total weight of the raw material flour), thereby adhering the edible oil to the entire surface of the noodle strands. The noodle strands were then immediately subjected to a steam treatment for 2 minutes 30 seconds, yielding steamed noodles. Subsequently, the steamed noodles were dipped for approximately 3 minutes in a flavoring solution, which had been prepared by dissolving 80 g of salt and 5 g of MSG in 1 L and then heating the solution to 60° C.

Subsequently, the steamed noodles that had been subjected to the above flavoring step were cut to a length of 20 to 25 cm per serving (a weight of 80 g/serving), and the cut noodles were placed inside a retainer (drying frame: a ring-shaped retainer with an upper diameter of 73 mm and a lower diameter of 87 mm) on top of a conveyor. The weight of noodles inside the retainer was 80 g, and the water content within the noodles was 45%.

Using a hot air blowing dryer (JETZONE system, a vertical impingement airflow system, manufactured by Arakawa Co., Ltd.), a hot air stream at a temperature of 142° C. was blown onto the noodles from above and below the retainer at a stream speed of 65 to 70 m/s for a period of 9 minutes, thereby drying and swelling the noodles, and producing the various dried noodle blocks listed below in Table 1 (water content: 6%).

(2) Evaluation of Dried Noodles

Each of the produced dried noodle blocks was placed in an instant noodles cup, 320 ml of hot water was added, and after standing for 3 minutes, 5 panelists ate the noodles and performed a sensory evaluation. In the sensory evaluation, the noodles were compared with fried noodles obtained by a representative production method, and were evaluated mainly for fried noodle-like taste and texture such as noodle elasticity and quality using the criteria listed below. The results are shown in Table 1.

(Evaluation Criteria)

5: Compared with fried noodles, the taste and texture were extremely good.

4: Compared with fried noodles, the taste and texture were good.

3: Compared with fried noodles, the taste and texture were slightly inferior.

2: Compared with fried noodles, the taste and texture were inferior.

1: Compared with fried noodles, the taste and texture were poor.

TABLE 1

| Oil addition method | | Oil content (dried | Sensory evaluation |
|---|---|---|---|
| Kneading | Spraying | noodle block) | (taste, texture) |
| 0% | 0% | 0% | 1 No fried noodle-like taste. Slightly uncooked texture, and puffed texture |
| 0% | 3% | 3% | 2 Inferior dried noodle-like taste. Slightly puffed texture |
| 0% | 5% | 5% | 3 Dried noodle-like taste, but inferior oily flavor and roasted sensation, and inferior fried noodle-like texture |
| 0% | 7% | 7% | 3 Dried noodle-like taste, but inferior oily flavor and roasted sensation, and inferior fried noodle-like texture |
| 0% | 9% | 9% | 1 Strong sensation of oiliness |
| 0% | 11% | 11% | 1 Strong sensation of oiliness |

As is evident from the results shown in Table 1, spraying edible oil onto the noodles was able to impart the noodles with a taste similar to fried noodles. Particularly in those cases where 5 to 7% of the edible oil was sprayed onto the noodles, a favorable fried noodle-like taste was achieved even though the noodles were non-fried noodles. However, compared with conventional fried noodles, the degree of oily flavor and the roasted sensation were inferior, and the fried noodle-like texture was also inferior. Overall, the results could not be claimed to be entirely satisfactory.

Further, when 9 to 11% of the edible oil was sprayed onto the noodles, a strong sensation of oiliness resulted.

Preliminary Experiment 2

Two methods of adding an edible oil to noodles were investigated, either by kneading the edible oil into the raw material flour, or by kneading the edible oil into the raw material flour and then also spraying the surface of the resulting raw noodles with additional edible oil, and the effects of these methods on the taste and texture of the noodles were then investigated Specifically, the investigations were performed in the manner described below.

(1) Production of Dried Noodles 900 g of wheat flour was dry-blended with 100 g of tapioca starch to prepare a raw material flour. To this raw material flour was added 330 ml of a mixing water in which had been dissolved 15 g of salt, 2 g of alkaline mineral water and 0.2 g of a carotene pigment, 20 ml of an edible oil (equivalent to 2% by weight based on the total weight of the raw material flour) was then added, and the resulting mixture was kneaded for 15 minutes in a normal pressure mixer to prepare a noodle dough. This noodle dough was rolled using a rolling machine and then cut using a cutting blade of a square blade No. 20, yielding noodle strands with a thickness of 0.77 mm.

Next, an additional 0 to 9% of the edible oil was sprayed uniformly onto the surface of the noodle strands in an amount shown in Table 2, thereby adhering the edible oil to the entire surface of the noodle strands. Subsequently, the same procedure as that described for preliminary experiment 1 was used to perform flavoring, packing of the noodles into a retainer and subsequent drying, yielding each of the noodle blocks shown in Table 2 (water content: 6%)

(2) Evaluation of Dried Noodles

Each of the produced noodle blocks was prepared in the same manner as that described for preliminary experiment 1, and 5 panelists then ate the noodles and performed a sensory evaluation. The sensory evaluation was performed in the same manner as preliminary experiment 1, and the noodles were evaluated using the same criteria. The results are shown in Table 2.

TABLE 2

| Oil addition method | | Oil content (dried | Sensory evaluation |
|---|---|---|---|
| Kneading | Spraying | noodle block) | (taste, texture) |
| 2% | 0% | 2% | 2 No fried noodle-like taste, but no puffed texture |
| 2% | 1% | 3% | 4 Both taste and texture feel slightly similar to those of fried noodles |
| 2% | 3% | 5% | 5 Both taste and texture feel the same as those of fried noodles |
| 2% | 5% | 7% | 5 Both taste and texture feel the same as those of fried noodles |
| 2% | 7% | 9% | 2 Fried noodle-like taste, but slightly oily |
| 2% | 9% | 11% | 1 Strong sensation of oiliness |

As is evident from the results shown in Table 2, by kneading an edible oil into the raw material flour, the texture of the noodles was improved compared with the case where no oil was kneaded into the flour (refer to the row in Table 1 in which the sprayed amount was 0% and the kneaded amount was 0%). However, the noodles lacked a fried noodle-like taste.

In contrast, in those cases where a combination of kneading and spraying was used, it was clear that when the total amount of oil used was within a range from 3 to 7%, the noodles had a fried noodle-like taste, as well as a favorable texture similar to the swelling observed for fried noodles. Further, although not shown in the table, if the amount of kneaded oil was set to 0.5% and the amount of oil adhered by spraying was set to 8%, resulting in a total amount of oil of 8.5%, a favorable result was obtained, with both the taste and texture feeling similar to those of fried noodles.

On the other hand, in those cases where, as shown above in Table 1, addition of the edible oil was performed only by spraying, even if the oil content within the noodle block was a similar value within a range from 3 to 7%, the oily taste and roasted sensation were inferior to those of conventional fried noodles, and the fried noodle-like texture was also inferior. Furthermore, in either case, it was found that if the total oil content within the dried noodle block following drying exceeded 9%, then an oily sensation could be detected, and the texture deteriorated.

Based on the above results, it is clear that by adding appropriate amounts of an edible oil, both by kneading the oil into the raw material flour and by spraying the oil onto the noodle strands, dried noodles can be obtained that have a taste and texture similar to fried noodles, and yet have a low caloric value.

Preliminary Experiment 3

The appropriate range for the amount of edible oil kneaded into the raw material flour was investigated in the manner described below.

(1) Production of Dried Noodles 900 g of wheat flour was dry-blended with 100 g of tapioca starch to prepare a raw material flour. To this raw material flour was added 330 ml of a mixing water in which had been dissolved 15 g of salt, 2 g of alkaline mineral water and 0.2 g of a carotene pigment. An amount of edible oil shown below in Table 3 between 0 and 33 ml (equivalent to 0 to 3% by weight based on the total weight of the raw material flour) was then added, and the resulting mixture was kneaded for 15 minutes in a normal pressure mixer to prepare a noodle dough. This noodle dough was rolled using a rolling machine and then cut using a cutting blade of a square blade No. 20, yielding noodle strands with a thickness of 0.77 mm.

Next, an additional 5% by weight of the edible oil relative to the weight of the raw material flour was sprayed uniformly onto the surface of the noodle strands, thereby adhering the edible oil to the entire surface of the noodle strands. Subsequently, the same procedure as that described for preliminary experiment 1 was used to perform flavoring, packing of the noodles into a retainer and subsequent drying, yielding each of the noodle blocks shown below in Table 3 (water content: 6%).

(2) Evaluation of Dried Noodles

Each of the produced noodle blocks was prepared in the same manner as that described for preliminary experiment 1, and 5 panelists then ate the noodles and performed a sensory evaluation. The sensory evaluation was performed in the same manner as preliminary experiment 1, and the noodles were evaluated using the same criteria. The results are shown in Table 3.

TABLE 3

| Oil addition method | | Oil content (dried noodle block) | Sensory evaluation (taste, texture) | |
|---|---|---|---|---|
| Kneading | Spraying | | | |
| 0% | 5% | 5% | 3 | Fried noodle-like taste, but slightly inferior |
| 0.5% | 5% | 5.5% | 4 | Both taste and texture feel slightly similar to those of fried noodles |
| 1.0% | 5% | 6% | 4 | Both taste and texture feel slightly similar to those of fried noodles |
| 1.5% | 5% | 6.5% | 5 | Both taste and texture feel the same as those of fried noodles |
| 2.0% | 5% | 7% | 5 | Both taste and texture feel the same as those of fried noodles |
| 2.5% | 5% | 7.5% | 4 | Taste is similar to that of fried noodles, but the texture is slightly inferior |

From the results in Table 3 it was clear that when the amount of edible oil kneaded into the flour was within a range from 0.5 to 2.5%, a favorable result was achieved, with both the taste and texture of the noodles favorable, and the taste being similar to that of fried noodles. It was also found that as the amount of kneaded oil was increased, the ease of production of the noodles tended to deteriorate.

Preliminary Experiment 4

When investigating the addition of resistant starch to the raw material flour, an unpredicted result was obtained in that the drying of the noodle block was accelerated. Accordingly, the amount of resistant starch added to the raw material flour was varied, and the effects on the drying rate and the noodle texture were investigated in detail in the manner described below.

(1) Preparation of Noodle Block

An amount of a resistance starch shown in Table 4 (product name: FIBERZIM, manufactured by Matsutani Chemical Industry Co., Ltd.) was dry-blended with 1 kg of a powder composed of 900 g of wheat flour and 100 g of tapioca starch to prepare a raw material flour. To this raw material flour mixture was added 330 ml of a mixing water in which had been dissolved 15 g of salt, 2 g of alkaline mineral water and 0.2 g of a carotene pigment, 3 ml of an edible oil (equivalent to 2% by weight based on the total weight of the raw material flour mixture) was then added, and the resulting mixture was kneaded for 15 minutes in a normal pressure mixer to prepare a noodle dough. This noodle dough was rolled using a rolling machine and then cut using a cutting blade of a square blade No. 20, yielding noodle strands with a thickness of 0.77 mm.

Next, an additional 5% by weight of the edible oil relative to the total weight of the raw material flour mixture was sprayed uniformly onto the surface of the noodle strands, thereby adhering the edible oil to the entire surface of the noodle strands. Subsequently, the same procedure as that described for preliminary experiment 1 was used to perform flavoring and packing of the noodles into a retainer, yielding noodle blocks of steamed noodles.

(2) Investigation of Drying Time

A hot air stream was blown onto each noodle block produced in the above manner, from above and below the retainer containing the noodle block, under the same conditions as those described in preliminary experiment 1, while the water content of the noodle block was measured continuously. The results are shown in Table 4.

TABLE 4

| Resistant starch | | Drying time | | | | | |
|---|---|---|---|---|---|---|---|
| | | 0 minutes | 2 minutes | 4 minutes | 6 minutes | 8 minutes | 10 minutes |
| Amount added | Proportion added [1] | Water content (%) | | | | | |
| 0 g | 0 (0)% | 45.38 | 28.50 | 14.42 | 8.89 | 6.06 | 3.58 |
| 50 g | 5 (4.8)% | 46.02 | 27.20 | 13.19 | 8.04 | 5.55 | 2.32 |
| 100 g | 10 (9.1)% | 45.86 | 26.55 | 12.85 | 8.19 | 5.02 | 2.35 |
| 200 g | 20 (16.7)% | 46.11 | 25.50 | 10.78 | 7.15 | 4.53 | 2.55 |
| 300 g | 30 (23.1)% | 45.86 | 25.45 | 9.97 | 5.25 | 3.56 | 2.05 |
| 500 g | 50 (33.3)% | 45.45 | 24.70 | 9.85 | 4.65 | 2.82 | 2.20 |
| 600 g | 60 (37.5)% | 46.75 | 24.45 | 9.68 | 4.52 | 2.92 | 1.65 |
| 700 g | 70 (41.2)% | 45.92 | 24.97 | 9.92 | 4.67 | 3.05 | 1.40 |
| 800 g | 80 (44.4)% | 45.56 | 25.62 | 10.01 | 4.72 | 2.95 | 1.75 |

Note
[1] The proportion added is a so-called "exclusive proportion" numerical value, which is calculated based on the total weight of the raw material flour components other than the resistant starch, namely the combined weight of the wheat flour and the tapioca starch. The numerical values listed within the parentheses are so-called "inclusive proportion" values, which are calculated based on the total weight of the entire raw material flour including the resistant starch.

From the results in Table 4 it is evident that the drying rate can be increased by adding 50 g or more of resistant starch per 1 kg. However, if the amount added is 700 g or greater (exclusive proportion: 70% by weight), then although the final water content is low, stickiness of the noodles caused by the flavoring tends to increase, which worsens the penetration of the hot air stream, and therefore a decrease in the rate of reduction in the water content tends to be observed partway through the drying process. Furthermore, if the amount added is an exclusive proportion of 80% or greater, then producing the noodles becomes increasingly difficult, and a problem arises in that the noodles develop a soft texture with no continuity. For these reasons, the amount of resistant starch added to the raw material flour is preferably an exclusive proportion within a range from 5 to 70% by weight (an inclusive proportion of 4.8 to 41.2% by weight). When an exclusive proportion of 30% by weight of resistant starch is added, the drying efficiency can be improved particularly favorably, yielding a very satisfactory drying rate, and therefore the amount of resistant starch added is more preferably an exclusive proportion within a range from 30 to 60% by weight (an inclusive proportion of 23.1 to 37.5% by weight).

Preliminary Experiment 5

Based on the findings from preliminary experiment 4, the degree of improvement in the drying efficiency obtained upon addition of a resistant starch to noodles having a three-layer structure was investigated, together with the effects the resistant starch had on drying irregularities and the noodle texture.
(1) Preparation of Noodle Block
300 g of wheat flour was dry-blended with 100 g of tapioca starch, and 600 g of a resistant starch (product name: FIBERZIM, manufactured by Matsutani Chemical Industry Co., Ltd.) was then added to complete preparation of a raw material flour. To this raw material flour mixture was added 330 ml of a mixing water in which had been dissolved 15 g of salt, 2 g of alkaline mineral water and 0.2 g of a carotene pigment, 20 ml of an edible oil (equivalent to 2% by weight based on the total weight of the raw material flour mixture) was then added, and the resulting mixture was kneaded for 15 minutes in a normal pressure mixer to prepare a noodle dough. The resistant starch-containing noodle dough prepared in this manner is referred to using the term "inner layer" in the following description.

In a separate preparation, 900 g of wheat flour was dry-blended with 100 g of tapioca starch to prepare a raw material flour. To this raw material flour was added 330 ml of a mixing water in which had been dissolved 15 g of salt, 2 g of alkaline mineral water and 0.2 g of a carotene pigment, 20 ml of an edible oil (equivalent to 2% by weight based on the total weight of the raw material flour) was then added, and the resulting mixture was kneaded for 15 minutes in a normal pressure mixer to prepare a noodle dough. The noodle dough prepared in this manner is referred to using the term "outer layer" in the following description.

Next, both of the noodle doughs were rolled separately to form an inner layer noodle band and an outer layer noodle band, and the inner layer noodle band was then sandwiched between two outer layer noodle bands in a noodle band thickness ratio of outer layer:inner layer:outer layer=1:2:1 (weight ratio), thus forming a three-layer noodle band. After aging for 15 minutes, this three-layer noodle band was rolled in a combined machine, rolled further using a rolling machine, and then cut using a cutting blade of a square blade No. 20, yielding noodle strands with a thickness of 0.77 mm.

Subsequently, an additional 5% of the edible oil based on the weight of the raw material flour was sprayed uniformly onto the surface of the noodle strands, thereby adhering the edible oil to the entire surface of the noodle strands. Subsequently, the same procedure as that described for preliminary experiment 1 was used to perform steaming, flavoring, packing of the noodles into a retainer and subsequent drying, yielding a noodle block containing added resistant starch only within the inner layer (sample A in Table 5). Using a similar method to that described above, as shown in Table 5, a noodle block containing added resistant starch only within the outer layer (sample B), a noodle block containing half of the resistant starch within the inner layer and half within the outer layer (sample C), and a noodle block containing no added resistant starch within either the inner layer or the outer layer (sample D) were also prepared. The water content value within each noodle block prior to the drying step was approximately 45% for each of the samples A to D.
(2) Investigation of Drying Time
In this preliminary experiment 5, in a similar manner to that described for preliminary experiment 1, a hot air stream at a temperature of 142° C. was blown onto the noodle block from above and below the retainer at a stream speed of 65 to 70 m/s, thereby drying the produced noodle block. The water content value within the noodle block of each sample was measured continuously, and the drying times required to reduce the water content within each noodle block to a value of not more than 10% and a value of not more than 6% were investigated.
(3) Evaluation of Dried Instant Noodles
The prepared noodle blocks were cut with a knife, and the cross-section was inspected visually and evaluated for drying irregularities. In this evaluation, those cases where swelling and drying had not proceeded sufficiently, leaving localized portions in a raw noodle state, were identified as having drying irregularities. Further, each of the noodle blocks was prepared in the same manner as that described in preliminary experiment 1, and 5 panelists then ate the noodles and performed a sensory evaluation. The sensory evaluation was performed in the same manner as preliminary experiment 1, and the noodles were evaluated using the same criteria. The results of the above evaluations are shown in Table 6.

TABLE 5

Amount of added resistant starch

| Sample | Inner layer | Outer layer | Total across inner and outer layers |
|---|---|---|---|
| A | 60% | 0% | 30% |
| B | 0% | 60% | 30% |
| C | 30% | 30% | 30% |
| D | 0% | 0% | 0% |

TABLE 6

| Sample | Drying time (10% or less) | Drying time (6% or less) | Evaluation of drying irregularities | Remarks (re taste and texture) |
|---|---|---|---|---|
| A | 3 minutes 20 seconds | 4 minutes | No irregularities, uniform drying | Fried noodle-like taste and texture |
| B | 4 minutes | 5 minutes 30 seconds | Irregularities | Fried noodle-like taste and texture, but noodles lack uniform texture immediately after drying |
| C | 3 minutes 40 seconds | 5 minutes | Some irregularities | Fried noodle-like taste and texture |
| D | 6 minutes | 9 minutes | Almost none | Fried noodle-like taste and texture, but drying time was longer than samples A to C |

From the results in Table 6 it is clear that the samples containing the added resistant starch (samples A, B and C) exhibited a shortened drying time compared with the sample containing no added resistant starch (sample D). In the case where the resistant starch was added only to the inner layer (sample A), particularly favorable results were obtained, with the drying time able to be shortened considerably, no drying irregularities detected, and a uniform drying able to be achieved.

One cause of drying irregularities is when, in the initial stages of drying, the outside of the noodle strands undergo drying at a faster rate than the inside of the noodle strands. Based on this fact, it is thought that the reason that particularly favorable results were achieved for the sample A is that by adding the resistant starch to the inside of the noodle strands, the drying rate for the inside of the noodle strands is accelerated, thereby reducing the difference in drying rate relative to the outside of the noodle strands, which not only results in a faster overall drying rate for the noodles, but also suppresses the occurrence of drying irregularities.

The results of preliminary experiment 4 and preliminary experiment 5 confirmed that, regardless of whether the noodles structure was a single-layer noodle (sample C in the preliminary experiment 5 also effectively corresponds to this type of structure) or a three-layer noodle, the addition of a resistant starch was able to shorten the drying time. Moreover, according to the above observations, the occurrence of drying irregularities was able to be improved by shortening only the drying time for the interior of the noodle strands, which enabled a more uniform drying time to be achieved across the entire noodle strand. Accordingly, even in those cases where a small amount of resistant starch is added to the outer layer of a three-layer noodle, it is thought that provided the inner layer contains a larger amount of resistant starch than the outer layer, the drying time for the inner layer will be able to be shortened in a similar manner, yielding more uniform drying.

Example 1

The following description relates to the production of a single-layer noodle in accordance with the method of the present invention for producing instant noodles dried by a high-temperature hot air stream.
(1) Production of Dried Instant Noodles 900 g of wheat flour was dry-blended with 100 g of tapioca starch to prepare a raw material flour. To 1 kg of this raw material flour mixture was added 330 ml of a mixing water in which had been dissolved 15 g of salt, 2 g of alkaline mineral water and 0.2 g of a carotene pigment. 20 ml of an edible oil (equivalent to 2% by weight based on the total weight of the raw material flour) was then added, and the resulting mixture was kneaded (mixed) for 15 minutes in a normal pressure mixer to prepare a noodle dough. Subsequently, this dough was combined and rolled in accordance with normal methods for producing instant noodles, and was then cut using a cutting blade of a square blade No. 20, yielding raw noodle strands with a thickness of 0.77 mm.

Next, prior to performing a steam treatment, an edible oil was sprayed uniformly onto the surface of the prepared raw noodle strands. The amount of sprayed oil was 5% relative to the 1 kg of the raw material flour, namely, 50 ml of oil. Immediately following spraying of the edible oil, a steam treatment was performed for a period of 2 minutes to 2 minutes 30 seconds, yielding steamed noodles. The steamed noodle strands were then subjected to a similar flavoring treatment to that used for typical fried noodles. At this stage, the water content of the noodles was 45%.

Subsequently, the steamed noodles that had been subjected to the above flavoring treatment were cut to a length of 20 to 25 cm per serving (a weight of 80 g/serving), and the cut noodles were placed inside a drying frame (retainer) on top of a conveyor. The retainer used was a ring-shaped retainer with an upper opening diameter of 73 mm and a lower opening diameter of 87 mm.

Using a hot air blowing dryer (JETZONE system, a vertical impingement airflow system, manufactured by Arakawa Co., Ltd.), a hot air stream at a temperature of 142° C. was blown onto the noodles from above and below the retainer at a stream speed of 65 to 70 m/s for a period of 9 minutes, thereby drying the noodle strands contained inside the retainer and producing instant dried noodles having a water content of 6% and an oil content of 7%. The results of continuously observing the transition in the water content of the noodles during the drying treatment are shown in Table 8.

(2) Evaluation of Instant Dried Noodles

The instant dried noodles obtained in the manner described above were placed in an instant noodles cup, 320 ml of hot water was added, and after standing for 3 minutes, 5 panelists ate the noodles and performed a sensory evaluation. The results are shown in Table 7. As is evident from Table 7, dried instant noodles were obtained which had a taste similar to fried noodles and a swollen texture similar to fried noodles, and yet had a low caloric value in which the oil content was suppressed to approximately 7%.

Comparative Example 1

With the exception of performing the spraying of the noodle strands with oil after completion of the steam treatment, instant dried noodles were produced in the same manner as example 1. When the thus obtained instant dried noodles were subjected to a sensory evaluation in the same manner as example 1, the results revealed an unsatisfactory roasted sensation and a lack of a fried noodle-like taste. It is surmised that these evaluations are because when the edible oil is sprayed onto the noodles after the steam treatment, as in this comparative example 1, not only does penetration of the oil into the noodle strands deteriorate, but the roasting is performed in a state where little oil is present.

Comparative Examples 2 to 4

As illustrated in Table 7, with the exception of altering whether or not an edible oil was added to the raw material flour, and whether or not an oil was adhered to the noodle strands, instant dried noodles were produced in the same manner as example 1. The thus obtained instant dried noodles were subjected to a sensory evaluation in the same manner as example 1. The results are shown in Table 7. Further, in a similar manner to example 1, the results of continuously observing the transition in the water content of the noodle blocks during the drying treatment are shown in Table 8.

As is clear form Table 7, in example 1, which combined kneading of the oil into the raw material flour with spraying of the oil onto the surface of the noodle strands, taste and texture similar to fried noodles were obtained. On the other hand, in comparative examples 2 to 4, totally satisfactory fried noodle-like taste and texture could not be obtained.

TABLE 8

| | Drying time | | | | | |
|---|---|---|---|---|---|---|
| | 0 minutes | 2 minutes | 4 minutes | 6 minutes | 8 minutes | 10 minutes |
| | | | Water content (%) | | | |
| Example 1 | 46.10 | 26.75 | 14.38 | 8.67 | 6.11 | 3.12 |
| Comparative example 2 | 45.80 | 30.24 | 18.66 | 11.64 | 7.45 | 4.25 |
| Comparative example 3 | 45.44 | 28.14 | 16.14 | 10.16 | 6.42 | 4.12 |
| Comparative example 4 | 45.51 | 26.81 | 14.13 | 9.12 | 6.24 | 3.23 |

From the results for example 1 and comparative examples 2 to 4 shown in Table 8, it is clear that, compared with the case where no oil was added by kneading or spraying (comparative example 2), adding the edible by either kneading or spraying increases the drying rate, and the drying rate tends to increase the most when kneading and spraying of the edible oil are used in combination (example 1).

Figure 2:
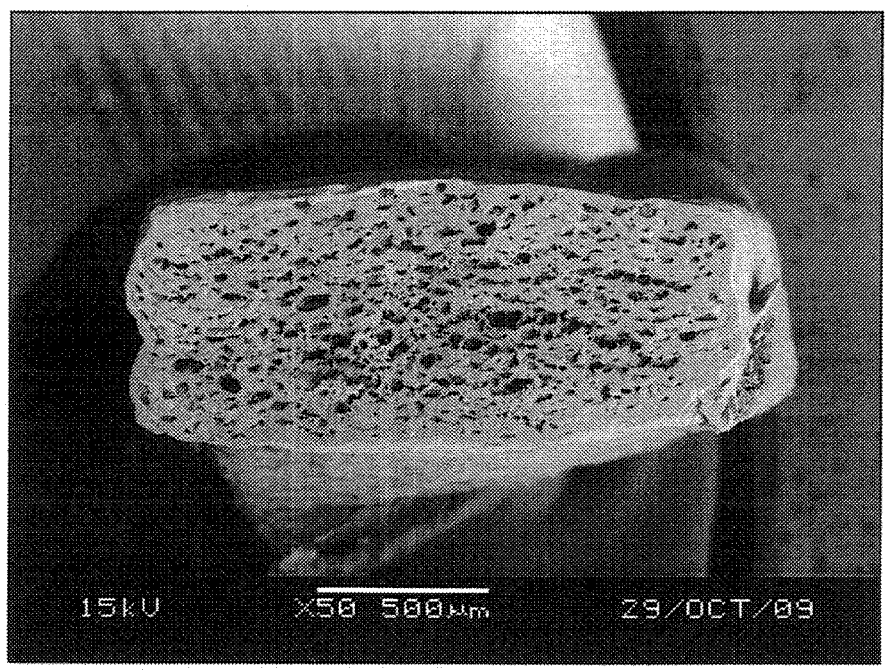
FIG. 2 is an electron microscope photograph (magnification: 50×) illustrating the cross section of a noodle strand of a dried instant noodle prepared in comparative example 2.
Figure 3:
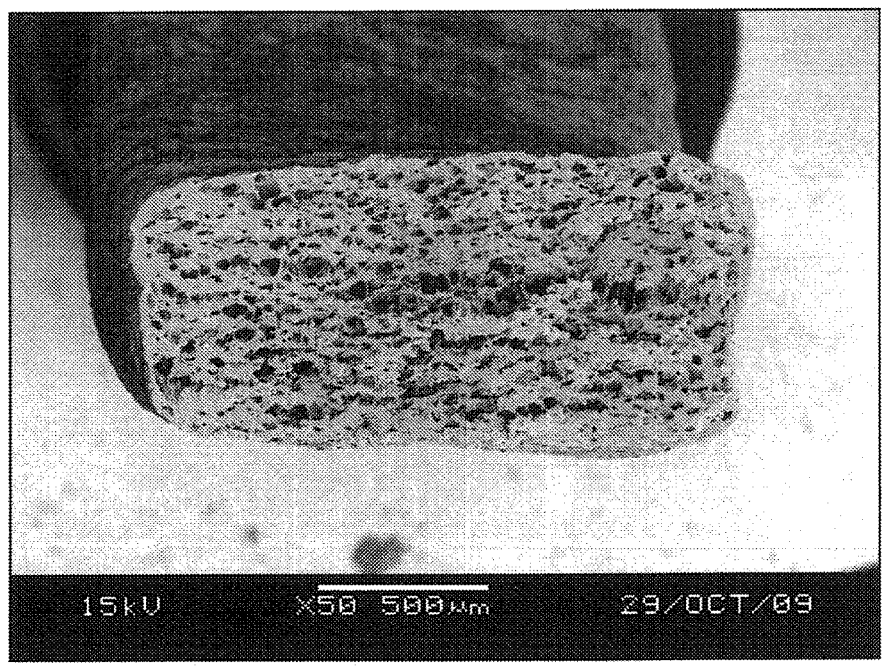
FIG. 3 is an electron microscope photograph (magnification: 50×) illustrating the cross section of a noodle strand of a dried instant noodle prepared in comparative example 3.
Figure 4:
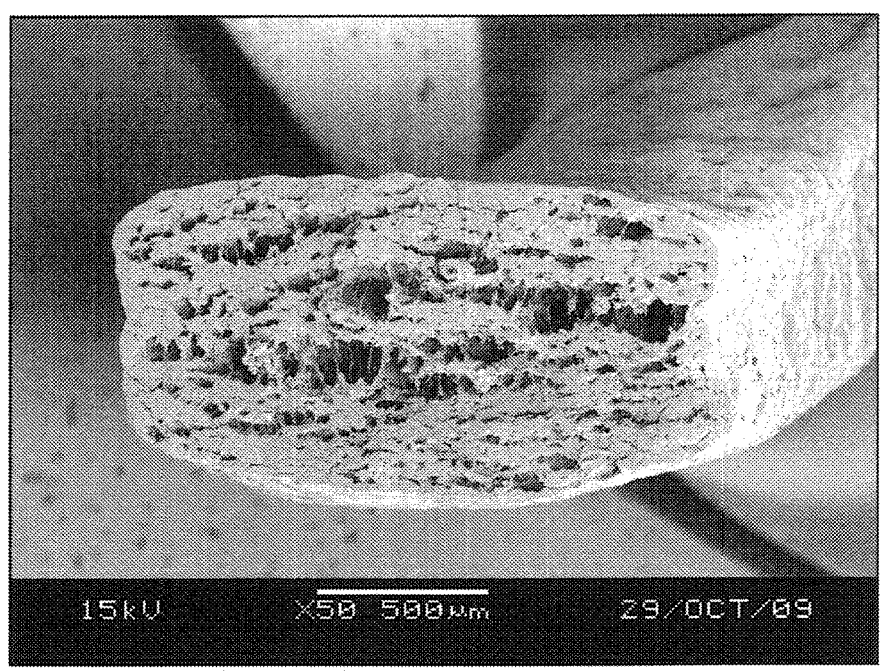
FIG. 4 is an electron microscope photograph (magnification: 50×) illustrating the cross section of a noodle strand of a dried instant noodle prepared in comparative example 4.

FIG. 1 shows an electron microscope photograph illustrating the cross section of a noodle strand of a dried instant noodle obtained in example 1. FIG. 2 to FIG. 4 show electron microscope photographs illustrating the cross sections of the instant dried noodles obtained in comparative examples 2 to 4 respectively. As shown in FIG. 1, the cross-section of the instant dried noodles obtained in example 1 reveals that swelling has proceeded uniformly at both the outside and the inside of the noodle strand, with the cross-section of the noodle strand being a rectangular shape with a slightly rounded outline. In comparison with example 1 (FIG. 1), in comparative example 2 (FIG. 2), little swelling has occurred, with minimal expansion of the noodle strand, and the cross-section remains a substantially rectangular shape. Further, in comparative example 3 (FIG. 3), slight swelling is observed at the outside of the noodle strand, but the cross-section remains a substantially rectangular shape. Moreover, in comparative example 4 (FIG. 4), clear swelling is seen within the interior of the noodle strand. As a result, compared with comparative examples 2 and 3 (FIG. 2 and

TABLE 7

| | Oil addition method | | Oil content | | Sensory evaluation (taste, texture) |
|---|---|---|---|---|---|
| | Kneading | Kneading | (dried noodle block) | | |
| Example 1 | 2% | 5% | 7% | 5 | Both taste and texture feel the same as those of fried noodles |
| Comparative example 2 | 0% | 0% | 0% | 1 | No fried noodle-like taste. Slightly uncooked texture, and puffed texture |
| Comparative example 3 | 0% | 7% | 7% | 3 | Fried noodle-like taste, but inferior oily taste and roasted sensation, and inferior fried noodle-like texture |
| Comparative example 4 | 7% | 0% | 7% | 3 | Fried noodle-like taste and roasted sensation. Noodle producibility is poor, and the noodles have a slightly hard and brittle texture |

FIG. 3), the external shape of the cross-section of the noodle strand of comparative example 4 (FIG. 4) has a slightly rounded outline, although it is clear that little swelling has occurred at the outside of the noodle strand.

From the above results it is clear that, as in example 1, by adding an edible oil to the raw material flour and also adhering an edible oil to the noodle strands, swelling of the noodles proceeds more favorably, yielding more uniform swelling. Although not constrained by theory, it is assumed that these observations are due to a synergistic effect resulting from promoting swelling near the surface of the noodle strands by spraying oil onto the surface of the noodle strands, and promoting swelling from within the noodle strands by kneading oil into the raw material flour.

Example 2

The following description relates to the production of a three-layer noodle in accordance with the method of the present invention for producing instant noodles dried by a high-temperature hot air stream.
(1) Production of Dried Instant Noodles 300 g of wheat flour was dry-blended with 100 g of tapioca starch, and 600 g of a resistant starch (product name: FIBERZIM, manufactured by Matsutani Chemical Industry Co., Ltd.) was then added to complete preparation of a raw material flour mixture. To this mixture was added 330 ml of a mixing water in which had been dissolved 15 g of salt, 2 g of alkaline mineral water and 0.2 g of a carotene pigment. 20 ml of an edible oil (equivalent to 2% by weight based on the total weight of the raw material flour) was then added, and the resulting mixture was kneaded for 15 minutes in a normal pressure mixer to prepare an inner layer noodle dough.

In a separate preparation, 900 g of wheat flour was dry-blended with 100 g of tapioca starch to prepare a raw material flour. To this raw material flour was added 330 ml of a mixing water in which had been dissolved 15 g of salt, 2 g of alkaline mineral water and 0.2 g of a carotene pigment, 20 ml of an edible oil (2%) was then added, and the resulting mixture was kneaded for 15 minutes in a normal pressure mixer to prepare an outer layer noodle dough.

Next, both of the noodle doughs obtained in the manner described above were rolled separately to form an inner layer noodle band and an outer layer noodle band, and the inner layer noodle band was then sandwiched between two outer layer noodle bands in a noodle band thickness ratio of outer layer:inner layer:outer layer=1:2:1 (weight ratio), thus forming a three-layer noodle band. After aging for 15 minutes, the three-layer noodle band was rolled in a combined machine, rolled further using a rolling machine, and then cut using a cutting blade of a square blade No. 20, yielding noodle strands having a three-layer structure and an overall thickness of 0.77 mm.

Next, prior to performing a steam treatment, an edible oil was sprayed uniformly onto the surface of the prepared raw noodle strands. The amount of sprayed oil was 5% relative to the 1 kg of the raw material flour, namely, 50 ml of oil. Immediately following spraying of the edible oil, a steam treatment was performed for a period of 2 minutes to 2 minutes 30 seconds, yielding steamed noodles. The steamed noodle strands were then subjected to a similar flavoring treatment to that used for typical fried noodles. At this stage, the water content of the noodles was 45%.

Subsequently, the steamed noodles that had been subjected to the above flavoring treatment were cut to a length of 20 to 25 cm per serving (a weight of 80 g/serving), and the cut noodles were placed inside a drying frame (retainer) on top of a conveyor. The retainer used was a ring-shaped retainer with an upper opening diameter of 73 mm and a lower opening diameter of 87 mm.

Using a hot air blowing dryer (JETZONE system, a vertical impingement airflow system, manufactured by Arakawa Co., Ltd.), a hot air stream at a temperature of 142° C. was blown onto the noodles from above and below the retainer at a stream speed of 65 to 70 m/s for a period of 4 minutes, thereby drying the noodle strands contained inside the retainer and producing instant dried noodles having a water content of 6% and an oil content of 7%.
(2) Evaluation of Instant Dried Noodles The instant dried noodles obtained in the manner described above were placed in an instant noodles cup, 320 ml of hot water was added, and after standing for 3 minutes, 5 panelists ate the noodles and performed a sensory evaluation. The results revealed that dried instant noodles had been obtained which had a taste similar to fried noodles and a swollen texture similar to fried noodles, and yet had a low caloric value in which the oil content had been suppressed to approximately 7%.

Figure 5:
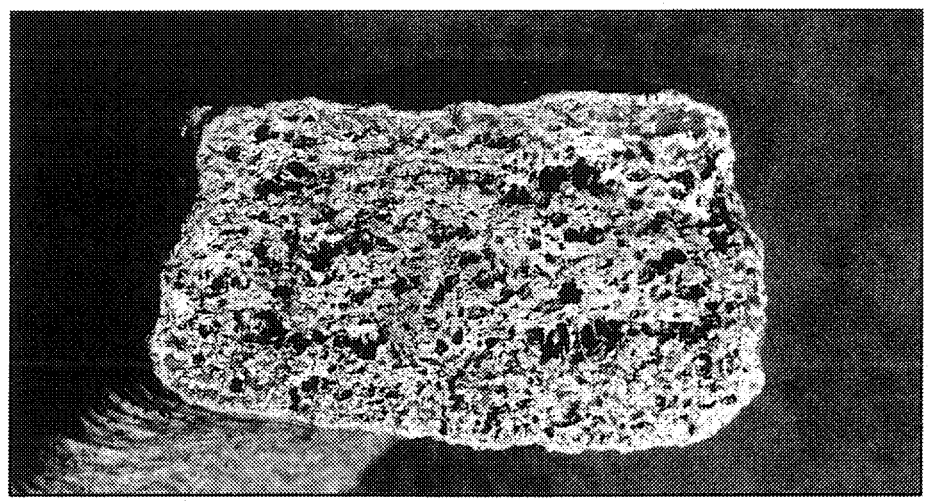
FIG. 5 is an electron microscope photograph (magnification: 50×) illustrating the cross section of a noodle strand of a dried instant noodle of the present invention prepared in example 2.

FIG. 5 shows an electron microscope photograph illustrating the cross section of a noodle strand of a dried instant noodle obtained in example 2. As shown in FIG. 5, compared with example 1 (FIG. 1), the noodle strands of example 2 exhibited more uniform swelling. Further, whereas 9 minutes of drying time were required in example 1 to obtain a noodle block with a water content of 6%, in example 2, the existence of the resistant starch in the interior of the noodle strands meant the drying rate was accelerated, enabling a favorable noodle block to be obtained with a drying time of only 4 minutes.

From the above description it should be self-evident that various different embodiments can be made over a broad range without departing from the spirit or scope of the present invention. Accordingly, the present invention is limited only by the appended claims, and is in no way constrained by the specific embodiments outlined above.

The invention claimed is:

1. A method for producing instant noodles dried by a high-temperature hot air stream, the method comprising:
    producing a noodle band from a noodle dough prepared by adding an edible oil to a noodle dough material comprising a raw material flour, and then producing raw noodle strands from the noodle band, wherein an amount of the edible oil added to the raw material flour is within a range from 0.5 to 2.5% by weight based on a total weight of the raw material flour,
    adhering an edible oil to the raw noodle strands, and then steaming the raw noodle strands to produce steamed noodles, wherein an amount of the edible oil adhered to the raw noodle strands is within a range from 1 to 8% by weight based on a total weight of the raw material flour,
    forming a noodle block by packing a predetermined amount of the steamed noodles into a retainer, and
    swelling and drying the noodle block by blowing a hot air stream at a temperature of 120° C. to 160° C. onto the noodle block from above and below the retainer at a stream speed of 50 m/s to 70 m/s for a period of 3 to 15 minutes, wherein the noodle block is swelled and dried until a moisture content of the noodle block falls to not more than 6%,
    wherein a total amount of the oil used in the producing and in the adhering is within a range from 3 to 8.5% by weight based on a total weight of the raw material flour, wherein in the producing, three noodle bands are formed, the three noodle bands are laminated to produce a three-layer noodle band having an outer layer/inner layer/outer layer structure, raw noodle strands having a three-layer structure are subsequently produced from the three-layer noodle band, and a resistant starch is added to the inner layer, wherein only the inner layer contains resistant starch.

2. A method for producing instant noodles dried by a high-temperature hot air stream, the method comprising:

producing a noodle band from a noodle dough prepared by adding an edible oil to a noodle dough material comprising a raw material flour, and then producing raw noodle strands from the noodle band, wherein an amount of the edible oil added to the raw material flour is within a range from 0.5 to 2.5% by weight based on a total weight of the raw material flour, adhering an edible oil to the raw noodle strands, and then steaming the raw noodle strands to produce steamed noodles, wherein an amount of the edible oil adhered to the raw noodle strands is within a range from 1 to 8% by weight based on a total weight of the raw material flour, forming a noodle block by packing a predetermined amount of the steamed noodles into a retainer, and swelling and drying the noodle block by blowing a hot air stream at a temperature of 120° C. to 160° C. onto the noodle block from above and below the retainer at a stream speed of 30 m/s to 70 m/s for a period of 3 to 15 minutes, wherein the noodle block is swelled and dried until a moisture content of the noodle block falls to not more than 6%, wherein a total amount of the oil used in the producing and in the adhering is within a range from 3 to 8.5% by weight based on a total weight of the raw material flour, and wherein in the producing,
three noodle bands are formed,
the three noodle bands are laminated to produce a three-layer noodle band having an outer layer/inner layer/outer layer structure,
raw noodle strands having a three-layer structure are subsequently produced from the three-layer noodle band, and
a resistant starch is added only to the inner layer.

3. The method of producing instant noodles according to claim 2, further comprising shortening the time to dry the noodle block until a moisture content of the noodle block falls to not more than 6% by adding a resistant starch to the raw material flour.

4. The method of producing instant noodles according to claim 2, wherein the drying of the noodle block comprises a first drying stage by which a water content of the noodle block is reduced to not more than 20% by a first combination of temperature and air stream speed, and a second drying stage by which the water content of the noodle block is reduced to not more than 6% by a second and different combination of temperature and air stream speed.

5. The method of producing instant noodles according to claim 2, wherein the drying of the noodle block comprises a first drying stage by which a water content of the noodle block is reduced to not more than 20% by blowing an air stream at a first speed onto the top of the retainer and blowing an air stream at a second speed onto the bottom of the retainer.

6. The method of producing instant noodles according to claim 2, wherein the weight ratio of the outer layer:the inner layer:the outer layer is 1:2:1.

7. The method of producing instant noodles according to claim 2, wherein the stream speed is 65 m/s to 70 m/s.

8. The method of producing instant noodles according to claim 2, wherein the three noodle bands are aged for 15 minutes before rolling and cutting thereof.

9. The method of producing instant noodles according to claim 2, wherein the stream speed of the hot air stream blown from above the retainer is different from the stream speed of the hot air stream blown from below the retainer.

* * * * *